(No Model.)
H. C. BENDER.
NUT LOCK.
No. 289,494. Patented Dec. 4, 1883.
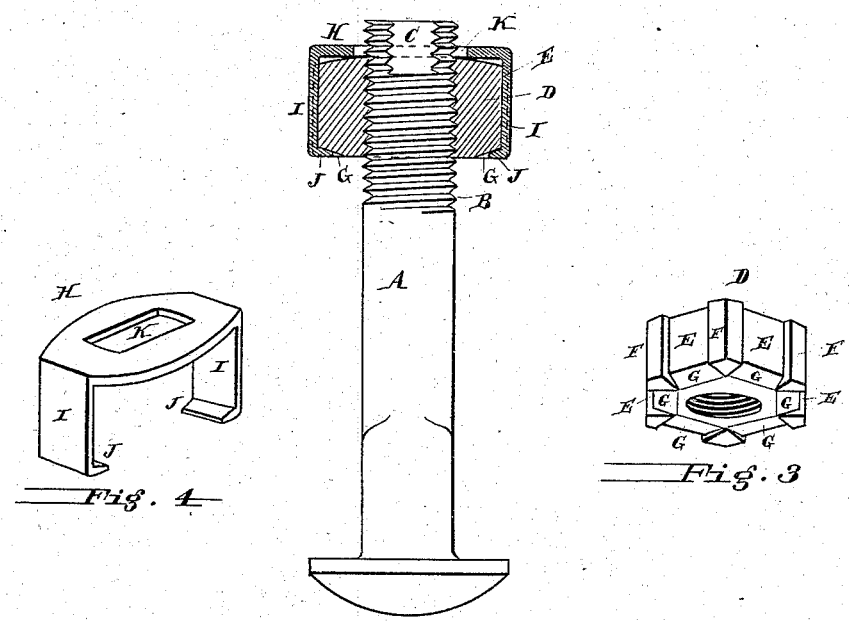
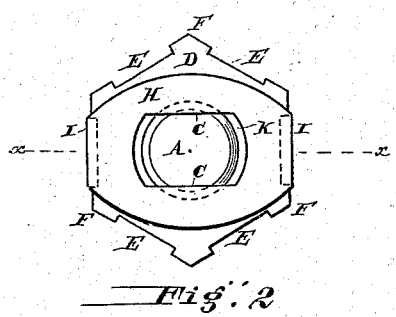
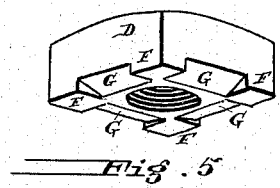
Attest
William McWade
Joshua Mattack
Inventor
Henry C. Bender

United States Patent Office.

HENRY C. BENDER, OF MONTGOMERYVILLE, PENNSYLVANIA.

NUT-LOCK.

SPECIFICATION forming part of Letters Patent No. 289,494, dated December 4, 1883.

Application filed October 20, 1883. (No model.)

*To all whom it may concern:*

Be it known that I, HENRY C. BENDER, of Montgomeryville, in the county of Montgomery and State of Pennsylvania, have invented an Improvement in Nut-Locks, of which the following is a specification.

My invention has reference to nut-locks; and it consists in certain improvements, fully set forth in the following specification, and shown in the accompanying drawings, which form part thereof.

Heretofore among various forms of nut-locks may be cited a nut whose sides have been grooved at right angles to the hole through the same, and the bolt provided with a flattened end and a spring-piece, which is provided with a slot to fit over said flattened end of the bolt, and arms to snap down into the grooves in the sides of the nut. The objection to this, however, laid in the fact that the spring piece or lock was liable to spring out of place, and if a rotary motion be imparted to the nut the said spring-arms would slip over the corners of the nut and unlock the same.

The object of my invention is to provide a peculiarly-shaped nut, and so form the spring locking-piece that neither of the above objectionable features can take place.

In the drawings, Figure 1 is a sectional elevation of a bolt and nut embodying my invention, taken on line x x of Fig. 2. Fig. 2 is a plan view of same. Fig. 3 is a perspective view of one form of nut, looking up from below. Fig. 4 is a perspective view of the spring locking-piece; and Fig. 5 is a perspective view, similar to that shown in Fig. 3, of another form of nut.

A is the bolt, which is provided on its end with a screw-thread, B, the end of which is flattened, as at C.

D is the nut, which may be square or hexagonal, as desired, which nut has its side faces grooved vertically, as at E, leaving the corners F intact as abutments. The under side of the nut is also notched to correspond with the side grooves, as at G, and these notches may be cut oblique or square, and as these do not extend over the full width of the side of the nut the corners F also form abutments to these notches or grooves.

H is the spring locking-piece, and is made U-shaped, having a rectangular slot, K, in its middle part, to fit over the flattened end of bolt A, and spring-arms I I, to fit down over the sides of the nut and lie in the grooves E, on diagonally-opposite sides, and these arms are provided on their ends with inwardly-projecting parts J J, which spring into the grooves or notches G, and hold the said locking-piece H firmly to the said nut and prevent any liability of its being accidentally knocked off. The spring-piece H cannot be turned around on the nut, as the steel edges of the arms I J would press against the abutments F on the nut, and thereby be prevented from slipping. If desired, the grooves E may be omitted, as the abutments F to the grooves or notches G would prevent the piece H turning on the nut.

Having now described my invention, what I claim as new, and desire to secure by Letters Patent, is—

1. A lock-nut consisting of the screw-threaded bolt having its end flattened, in combination with a nut having notches or grooves on its bottom edges, the said grooves being of less width than the width of the side of the nut, and a spring locking-piece provided with a rectangular slot to fit the end of said bolt, and spring-arms having their ends bent inward to snap into said grooves or notches, substantially as and for the purpose specified.

2. A lock-nut consisting of the screw-threaded bolt having its end flattened, in combination with a nut having vertical grooves on its sides, extending from top to bottom, and the said grooves being of less width than the width of the side of the nut, and a spring locking-piece provided with a rectangular slot to fit the end of said bolt, and spring-arms to snap into said grooves, substantially as and for the purpose specified.

3. The combination of bolt A, having screw-thread B and flattened end C, with spring locking-piece H, and a nut, D, having abutments F on its corners, substantially as and for the purpose specified.

4. The combination of bolt A, having screw-thread B and flattened end C, with spring locking-piece H, having slot K, arms I I, and ends J J, a nut D, having abutments F on its corners, and grooves E and G, substantially as and for the purpose specified.

5. A nut, D, having grooves E and notches G upon its bottom edge, the said grooves and notches being of less width than the width of the side of the nut, so as to form abutments F, substantially as and for the purpose specified.

In testimony of which invention I hereunto set my hand.

HENRY C. BENDER.

Witnesses:
R. M. HUNTER,
ISAIAH MATLACK.